(12) United States Patent
Wu et al.

(10) Patent No.: US 11,704,536 B1
(45) Date of Patent: Jul. 18, 2023

(54) CONVOLUTION CIRCUITRY (71) Applicant: Xilinx, Inc., San Jose, CA (US)

(72) Inventors: Michael Wu, Palo Alto, CA (US);
Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 860 days.

(21) Appl. No.: 16/427,214

(22) Filed: May 30, 2019

(51) Int. Cl.
*G06N 3/04* (2023.01)
*G06N 3/08* (2023.01)

(52) U.S. Cl.
CPC ... *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

2016/0358068 A1\* 12/2016 Brothers et al. ....... G06N 3/082
2018/0137406 A1\* 5/2018 Howard et al. ...... G06N 3/0454

OTHER PUBLICATIONS

Li, Hao et al., "Pruning Filters for Efficient Convnets," Mar. 10, 2017, pp. 1-13, ICLR Mar. 2017.
Szegedy, Christian et al., "Rethinking the Inception Architecture for Computer Vision," Dec. 11, 2015, pp. 1-10.
Gong, Yunchao et al., "Compressing Deep Convolutional Networks Using Vector Quantization, Dec. 18, 2014, pp. 1-10, ICLR 2015.
Han, Song et al., "Deep Compression: Compressing Deep Neural Networks with Pruning, Trained Quantization and Huffman Coding," Feb. 15, 2016, pp. 1-14, ICLR Feb. 2016.

\* cited by examiner

*Primary Examiner* — Lut Wong
(74) *Attorney, Agent, or Firm* — Crawford Maunu PLLC (57) ABSTRACT

Disclosed approaches for convolving input feature maps in a neural network include a circuit arrangement circuit that includes memory circuitry and convolution circuitry. The memory circuitry is configured to store K NxN first filters, and C 1x1 second filters, wherein $N \geq 1$, and $1 < K < C$. The convolution circuitry is coupled to the memory circuitry and configured to convolve a three-dimensional input feature map with the K NxN first filters into an intermediate volume having a depth of K, and convolve the intermediate volume with the C 1x1 second filters into an output feature map having a depth of C.

8 Claims, 5 Drawing Sheets

CONVOLUTION CIRCUITRY

TECHNICAL FIELD

The disclosure generally relates to convolving feature maps in neural networks.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tanh) function, the Rectified Linear Unit (ReLU) function, and the identity function. Neural network models are often organized into layers of nodes, which define a specific topology, and corresponding weights and biases. The weights and biases are referred to as network parameters.

Neural networks can generally include an input layer, an output layer, and one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Input feature maps can be processed at the convolution layers using different filters, which are sometimes referred to as kernels. Each filter is a matrix of weights that is convolved with the input feature map to compute an output feature map. The convolution process can involve multiple memory accesses for obtaining the weights and storing the resulting computations. The convolution layers are also computationally intensive.

SUMMARY

A disclosed circuit arrangement includes memory circuitry and convolution circuitry. The memory circuitry is configured to store K NxN first filters, and C 1x1 second filters, wherein $N \geq 1$, and $1 < K < C$. The convolution circuitry is coupled to the memory circuitry and configured to convolve a three-dimensional input feature map with the K NxN first filters into an intermediate volume having a depth of K, and convolve the intermediate volume with the C 1x1 second filters into an output feature map having a depth of C.

Another disclosed circuit arrangement includes a plurality of convolution layers of a convolution neural network. Each convolution layer includes memory circuitry and convolution circuitry. The memory circuitry is configured to store K NxN first filters, and C 1x1 second filters, wherein $N \geq 1$, and $1 < K < C$. The convolution circuitry is coupled to the memory circuitry and configured to convolve a three-dimensional input feature map with the K NxN first filters into an intermediate volume having a depth of K, and convolve the intermediate volume with the C 1x1 second filters into an output feature map having a depth of C. For the convolution neural network, C has different values in two or more of the convolution layers, N has different values in two or more of the convolution layers, or K has different values in two or more of the convolution layers. The input feature map of each convolution layer other than a first convolution layer of the plurality of convolution layers is the output feature map of another convolution layer of the plurality of convolution layers.

A disclosed method includes determining refactorization components of C NxN filters of a convolution layer by performing on a computer processor operations including selecting a value of K and decomposing the C NxN filters into refactorization components of K NxN first filters and C 1x1 second filters using the value of K, wherein $N \geq 1$, and $1 < K < C$. The computer processing operations further include convolving an input feature map with the K NxN first filters into an intermediate volume having a depth of K, and convolving the intermediate volume with the C 1x1 second filters into an output feature map having a depth of C. Additionally, the computer processing operation include The computer processing operations evaluating acceptability of the output feature map relative to a baseline output feature map associated with the C NxN filters, reducing the value of K and repeating the decomposing, convolving the input feature map, convolving the intermediate volume, and evaluating in response to the output feature map being acceptable, and storing the K NxN first filters and C 1x1 second filters from a previous iteration in association with the convolution layer in a memory in response to the output feature map being unacceptable.

Other features will be recognized from consideration of the Detailed Description and Claims, which follow.

BRIEF DESCRIPTION OF THE DRAWINGS

Various aspects and features of the circuitry and method will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods use convolution circuitry to convolve an input feature map (IFM) using two smaller convolution operations that are a decomposition of an original larger convolution. The two smaller convolution operations approximate the larger convolution operation and use smaller filters than the original convolution. For example, an original three-dimensional filter F that includes C NxN filters is decomposed into a first convolution component that uses K NxN first filters and a second convolution component that uses C 1x1 second filters, where K is much less than C. The IFM, to the decomposed convolution layer of the neural network, is first convolved with the K NxN first filters into an intermediate volume having a depth of K. The intermediate volume is then convolved with the C 1x1 second filters into an output feature map (OFM) having a depth of C. The OFM approximates convolution of the IFM with the C NxN filters. Using the smaller convolution operations using the K NxN first filters and C 1x1 second filters, as compared to the C NxN filters, reduces the computation and memory requirements of the convolution for the respective convolution layer due to fewer compute-intensive multiplication operations and fewer memory accesses and weight storage. The circuit and methods can be implemented or used with machine learning (ML) accelerators and ML toolkits.

The disclosed circuits and methods can decompose an original convolution into refactorized components. The convolution operation of a respective convolution layer is decomposed from the original filter F into the smaller refactorization components that approximate the convolution operations of F.

Figure 1:
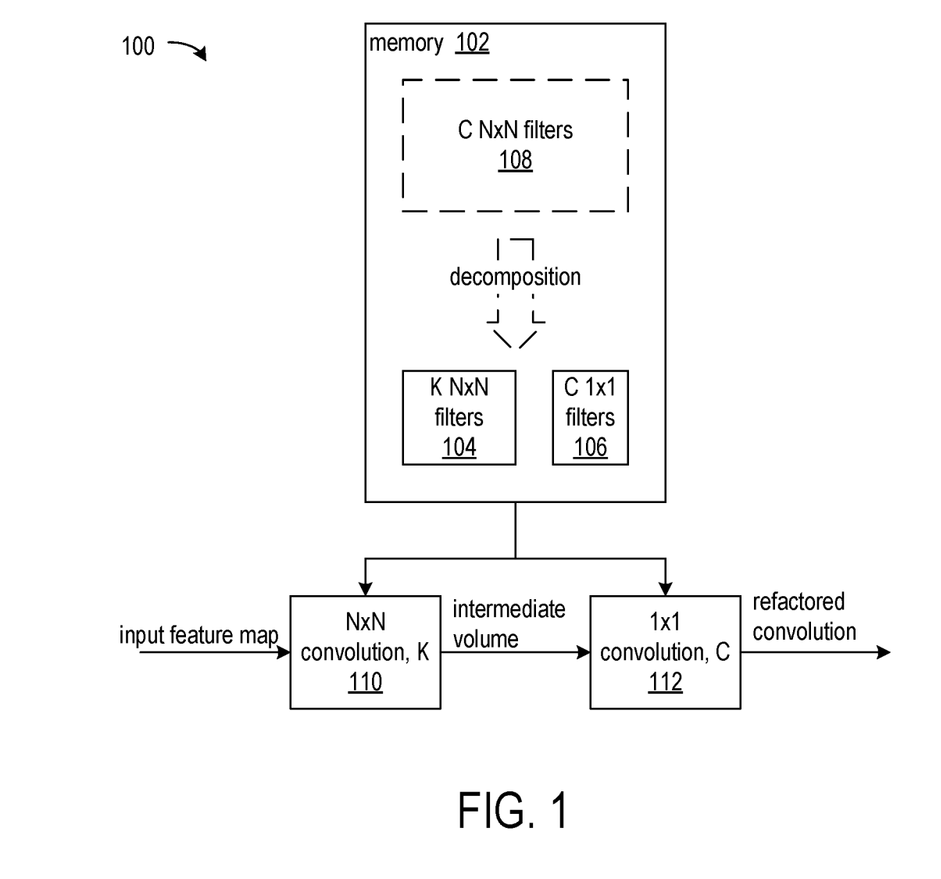
FIG. 1 shows a circuit arrangement and dataflow for performing convolution operations on an input feature map (IFM) consistent with the disclosed convolution circuitry.

FIG. 1 shows a circuit arrangement 100 and dataflow for performing convolution operations on an IFM consistent with the disclosed convolution circuitry. The disclosed convolution circuitry operates within a circuit arrangement for neural network processing.

The circuit arrangement 100 includes memory circuitry 102 and the convolution circuitry 110, 112. The circuit arrangement 100 responds to an input IFM, performs a first convolution on the IFM using K NxN first filters, performs a second convolution using C 1x1 second filters on the output of the first convolution, and outputs an OFM. The K NxN first filters and C 1x1 second filters are refactorization components of an input F filter, which includes C NxN filters. The memory circuitry 102 stores the K NxN first filters and the C 1x1 second filters. The K NxN first filters and C 1x1 second filters support smaller convolution operations than does the larger C NxN filters.

The circuit arrangement 100 can reduce the convolution complexity of respective convolution layers by using refactored convolution operations. For example, an original filter F, that includes C NxN filters 108, is decomposed into the smaller refactorization components of K NxN first filters 104 and C 1x1 second filters 106. The storage and bandwidth requirements for K NxN first filters 104 and C 1x1 second filters 106 is much less than that required for C NxN filters 108 when K is much less than C. In addition, the total number of multiply and accumulate operations performed by the first convolution component using the K NxN first filters 104 and the second convolution component using the C 1x1 second filters 106 is significantly less than the number of multiply and accumulate operations required for C NxN filters 108 when K is significantly less than C. In some specific embodiments, $1 < K \leq C/2$ and $N \geq 1$, although embodiments are not so limited. Though refactorization may not produce sufficient compression of an original set of C NxN filters for smaller values of C and N = 1, if C is sufficiently large a suitable compression can be achieved. Although the filters are described in two dimensional terms, the filters can be three dimensional filters having width, height, and depth dimensions. In such embodiments, the original set of C NxN filters have a depth dimension that is the same as the depth dimension of the IFM. When the original set of filters (e.g., C NxN filters) have a sufficient depth dimension, the refactorization can produce sufficient compression of the original set of filters for smaller values of C and N.

The original C NxN filters 108 and the refactorization components of K NxN first filters 104 and C 1x1 second filters 106 produce an OFM of the same dimension, such that the OFM is NxN with a depth of C. The convolution circuitry is coupled to the memory circuitry 102 and includes convolution circuit 110 that convolves a three-dimensional IFM with the K NxN first filters 104 into an intermediate volume having a depth of K. The convolution circuitry further includes the convolution circuit 112 that convolves the intermediate volume with C 1x1 second filters 106 into an OFM having a depth of K. The resulting refactored convolution, output as the OFM, has the same dimension as would a much larger convolution involving the C NxN filters 108.

The convolution circuits 110 and 112 can be implemented as one or more arrays of multiply and accumulate (MAC) circuits, along with control circuitry for reading weights of the K NxN first filters 104 and the C 1x1 second filters 106 and providing the weights at the proper times and inputs of the MAC array. The processing within each convolution circuit can be pipelined in circuit resources of programmable logic or an application specific integrated circuit (ASIC). In other implementations, the convolution circuits 110 and 112 can be one or more programmed processor circuits such as a central processing unit (CPU), graphics processing unit (GPU), reduced instruction set computing (RISC) processor, etc., or multi-core variations thereof. The memory circuitry 102 can be on-chip memory with the convolution circuits 110 and 112 or off-chip, depending on application requirements.

Figure 2:
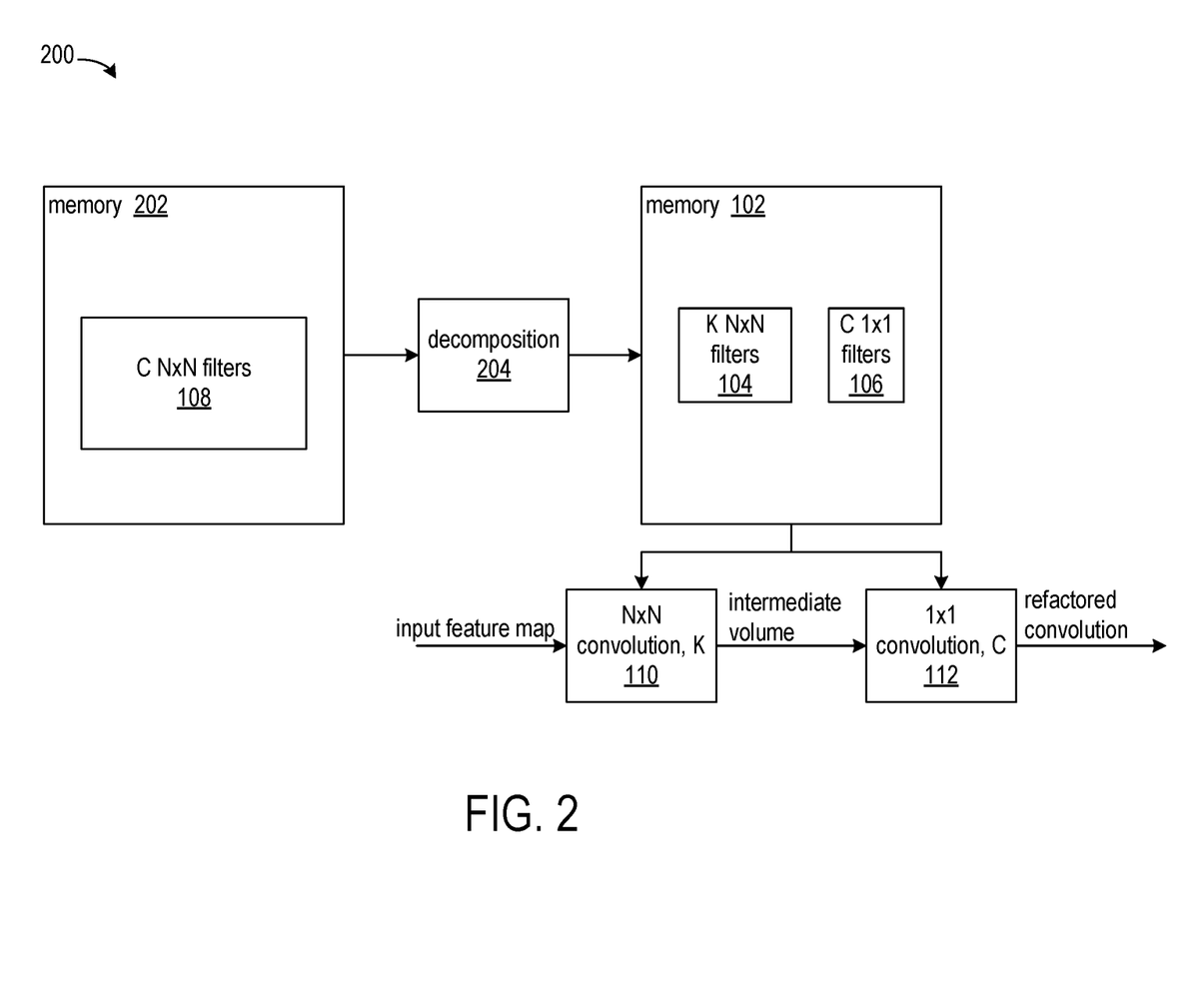
FIG. 2 shows another circuit arrangement and dataflow for performing decomposition of a filter and convolution on an IFM consistent with the disclosed convolution circuitry.

FIG. 2 shows another circuit arrangement 200 and dataflow for performing decomposition of a filter and convolution on an IFM using convolution components consistent with the disclosed convolution circuitry 110, 112. The circuit arrangement 200 includes the previously described memory circuitry 102 and convolution circuitry 110, 112, as described by FIG. 1. The circuit arrangement 200 includes memory circuitry 202 and decomposition circuitry 204. The memory circuitry 202 stores the C NxN filters 108. In various embodiments, the memory circuitry 102 and 202 can be separately addressed random access memories (RAMs) or the same RAM. The decomposition circuitry 204, and optionally the memory circuitry 202, can be off-chip, such as circuitry forming part of a computer or other data processing system that is suitable for storing and/or executing program code and that is in communication with one or more of the memory circuitry 102 and the convolution circuitry 110, 112.

The decomposition circuitry 204 decomposes the C NxN filters 108 into the K NxN first filters 104 and the C 1x1 second filters 106, and stores the smaller first and second filters in the memory circuitry 102. As described above, the K NxN first filters 104 and the C 1x1 second filters 106 are refactorization components of the C NxN filters 108. The decomposition circuitry 204 determines the refactorization components using a low rank matrix approximation, such as using singular value decomposition (SVD), a "CUR" matrix decomposition, which involves matrices C, U, and R, among other approximations. To decompose the C NxN filters 108, the decomposition circuitry 204 identifies the refactorization components where K < C. The convolution operation, as described above, can be represented by Z = FD, where Z is the OFM, F includes the C NxN filters 108, and D is the IFM. Using SVD as a specific example, SVD is used to decompose F to obtain F = UΣV*, where Σ is a C x C diagonal matrix consisting of singular values (1x1) of F in descending order (e.g., non-negative numbers on the diagonal), and U and V are left and right-singular vectors of F. For example, U can be a row by row vector of F and V can be a column by column vector of F. Additionally, V* and U* are rotations of the respective matrix on an axis.

The first K diagonal values of Σ can be kept and the rest are set to zero to obtain $\bar{\Sigma}$. The square root of $\bar{\Sigma}$ is used to obtain $\bar{\Sigma}$SS. S is applied to U and V*. As $\bar{\Sigma}$ consist of the first K diagonal values, the first K columns of US are kept to obtain Û, and the first K rows of SV* are kept to obtain $\overline{V^*}$. This results in a low rank approximation of F and can be used to rewrite the original matrix as Z' = Û$\overline{V^*}$D, where Z' ≈ Z.

The two matrix multiplications can be written as two consecutive convolutions, where the first refactorization component (Σ= $\overline{V^*}$ D) uses the same dimension filter (e.g., NxN) as the original convolution with K filters, resulting in the K NxN first filters 104. The second refactorization component (Z' = $\overline{U\Sigma}$) consist of C 1x1 filters to reconstruct the OFM that matches the original output dimensions, resulting in the C 1x1 second filters 106.

An initial K can be obtained by observing performance of a convolutional neural network (CNN) with different values for K for a convolution layer and/or each convolution layer. The smallest K can be selected that results in an acceptable OFM relative to a baseline OFM associated with the original convolution (e.g., the C NxN filters 108). If the storage requirements of Û and $\overline{V^*}$ are greater than the storage requirements of the C NxN filters 108, the refactorized components are not stored and/or used.

In accordance with various embodiments, the decomposition circuitry 204 is used to replace each convolution layer of the CNN with two refactorized components that are smaller than the original convolution and which is used to retrain the CNN. The decomposition circuitry 204 can be a programmed processor circuit or programmable logic, for example.

As illustrated, the above-described decomposition can be used for compression. The decomposition circuitry 204 decomposes the original F into the two refactorization components, e.g., K NxN first filters 104 and C 1x1 second filters 106. The refactorization components are communicated to the memory circuitry 102, in place of the original C NxN filters 108. Communicating the K NxN first filters 104 and C 1x1 second filters 106, instead of the C NxN filters 108, can reduce a bandwidth of the transmission and/or of otherwise moving data from host memory to on-chip memory available to an accelerator circuit that performs convolution. At the memory circuitry 102, the original C NxN filters 108 can be reconstructed or otherwise approximated using the K NxN first filters 104 and C 1x1 second filters 106 and use of one NxN convolution, C to do the filtering. This can be used when 1x1 filters are not supported by the accelerator efficiently.

Figure 3:
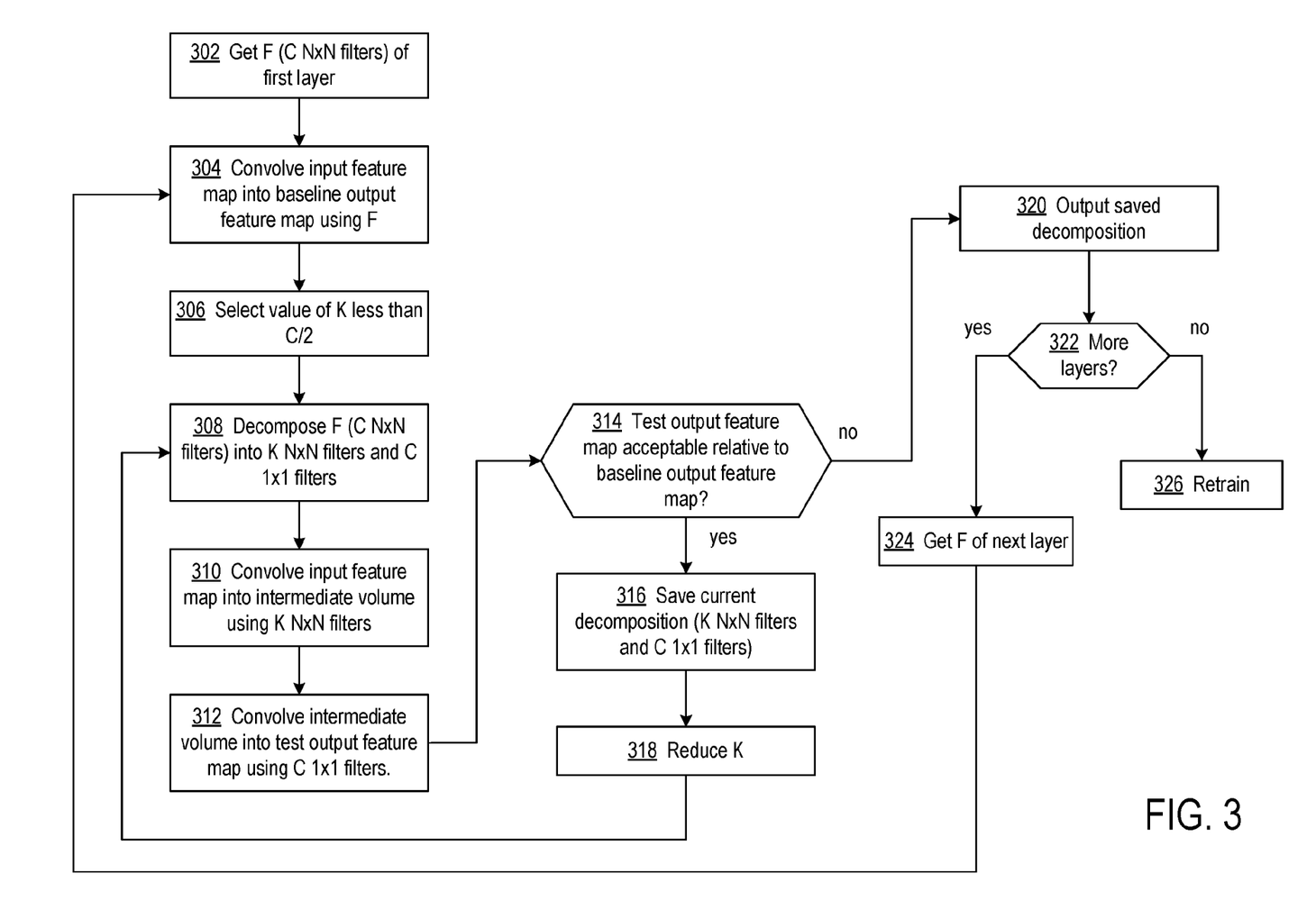
FIG. 3 shows a flowchart of a decomposition process performed by the disclosed decomposition circuitry.

FIG. 3 shows a flowchart of a decomposition process performed by disclosed decomposition circuitry. At block 302, the decomposition circuitry is provided with F, where F includes the C NxN filters of a first (or other) layer of the CNN. In some embodiments, at block 304, the decomposition circuitry convolves an IFM with the C NxN filters into a baseline OFM.

The decomposition circuitry, at block 306, selects a value of K. For example, the value of K can be less than C/2, although embodiments are not so limited. In response to selecting the value of K, at block 308, the decomposition circuitry decomposes F into refactorization components of K NxN first filters and C 1x1 second filters, where N > 2 and 1 < K < C.

The decomposition circuitry, at blocks 310 and 312, respectively convolves the IFM with the K NxN first filters into an intermediate volume having a depth of K and convolves the intermediate volume with the C 1x1 second filters into the OFM having a depth of C.

At decision block 314, the decomposition circuitry evaluates acceptability of the OFM relative to the baseline OFM associated with the C NxN filters. The acceptability can be associated with storage and/or accuracy requirements relative to the baseline OFM. For example, the acceptability can be a storage threshold and/or accuracy threshold.

If the OFM is acceptable relative to the baseline OFM, at block 316, the decomposition circuitry saves the current decomposition including the K NxN first filters and C 1x1 second filters. The decomposition circuitry then reduces the value of K, at block 318, and repeats the decomposing, convolving the IFM, convolving the intermediate volume, and evaluating, respectively at blocks 308, 310, 314, and decision block 314.

If the output OFM is not acceptable, at block 320, the respective decomposed filters of the previously stored OFM are output to a memory. For example, the decomposition circuitry stores the K NxN first filters and C 1x1 second filters from the previous iteration in association with the convolution layer in a memory in response to the OFM (from the current iteration) being unacceptable.

In specific embodiments, the acceptability is associated with storage requirements. For example, the OFM is evaluated by determining storage requirements of the K NxN first filters and the C 1x1 second filters stored in associated with the convolution layers. The K NxN first filters and the C 1x1 second filters replace the C NxN filters in response to the storage requirements being less than a threshold. The threshold can be associated with the storage requirements of the C NxN filters, as described above.

The CNN can include a plurality of convolution layers. At decision block 322, the decomposition circuitry determines whether there are more layers. If yes, the decomposition circuitry repeats the determination of the refactorization components of C NxN filters associated with each of the remaining plurality of convolution layers, respectively, of the CNN. For example, at block 324, the F of the next layer is obtained. Using the F, convolving the IFM with F (optionally), selecting the initial K, decomposing F, convolving F with the refactorization components, and evaluating acceptability, at blocks 304, 306, 308, 310, 312, and 314 are respectively repeated. The value of K, as described above, is iteratively reduced.

If there are no more convolution layers, at block 326, the decomposition circuitry retains the CNN having respective refactorization components associated with the plurality of convolution layers.

The parameter K can control the compression ratio, with smaller K values resulting in larger reductions in storage and operation count at the cost of classification accuracy. Both the computation and storage ratios can be defined as:

$$\gamma = \frac{K}{C} + \frac{K}{HWD},$$

where H, W, D are the dimension of the original F. Large filter matrices can be easier to compress compared to small filters, where 1x1 matrices are particularly difficult to compress.

Figure 4:
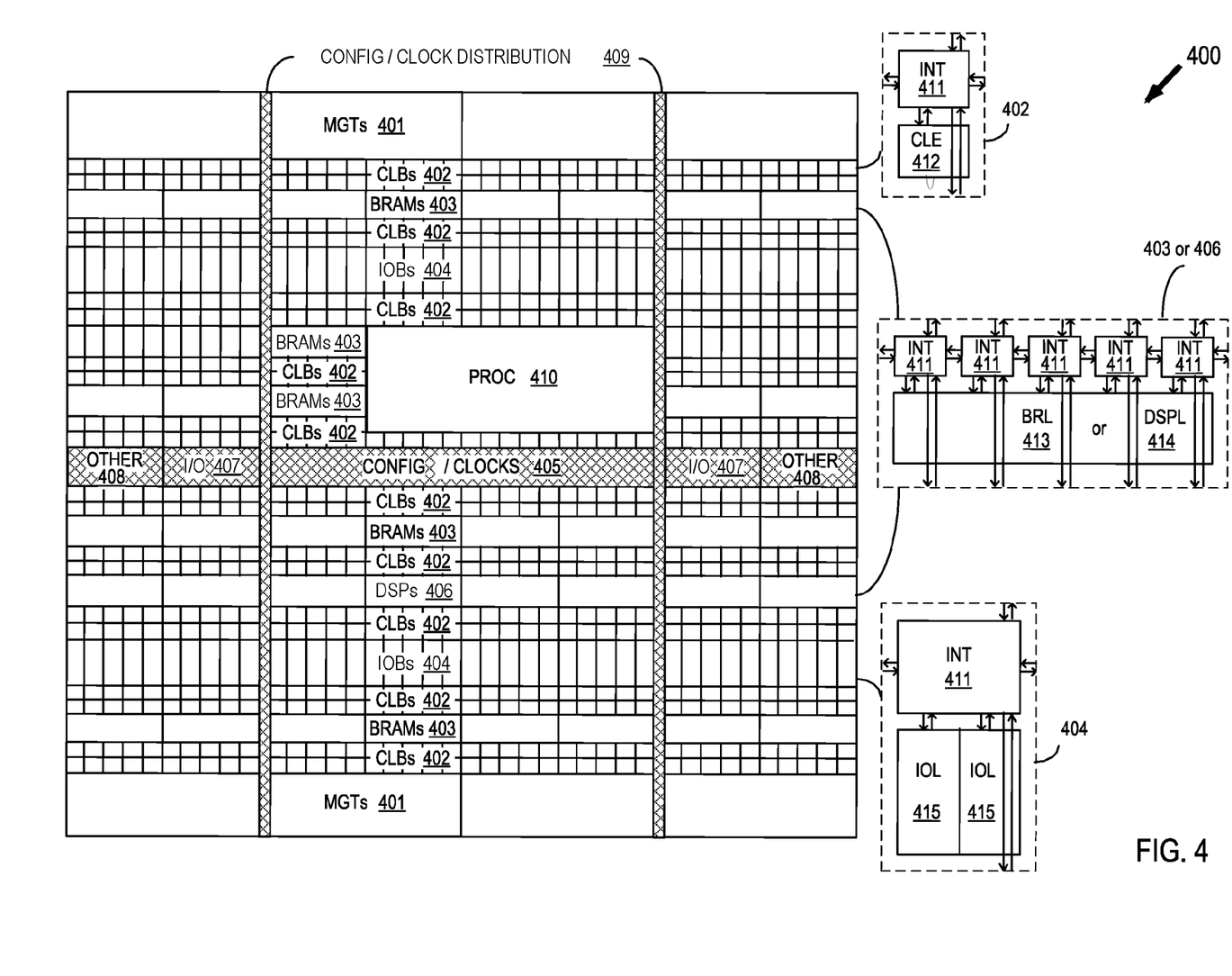
FIG. 4 shows a programmable integrated circuit (IC) on which the disclosed circuits and processes can be implemented.

FIG. 4 shows a programmable integrated circuit (IC) on which the disclosed circuits and processes can be implemented. For example, the circuit arrangement and dataflow processes illustrated by FIGS. 1 and 2 can be implemented on the IC illustrated by FIG. 4. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown). The disclosed circuit arrangements can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Figure 5:
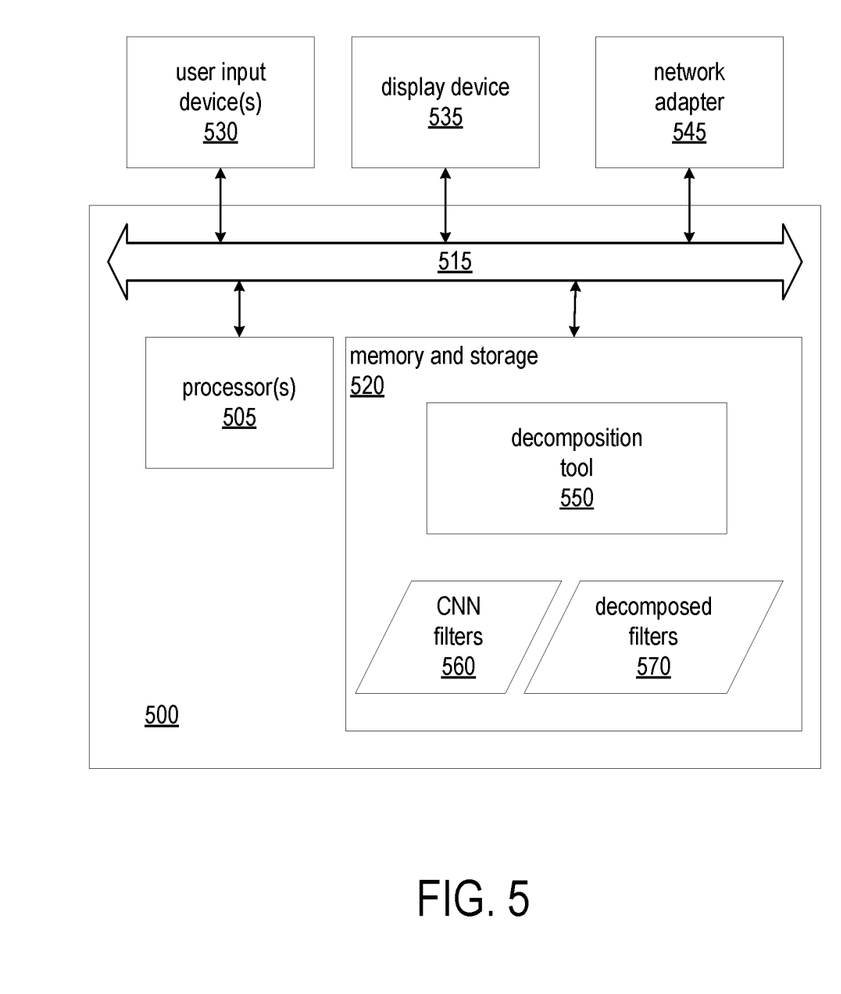
FIG. 5 shows a system on which the disclosed process of decomposition can be implemented.

FIG. 5 is a block diagram illustrating an exemplary data processing system (system) 500. System 500 is an example of a system on which the disclosed decomposition process of FIG. 3 can be implemented, herein referred to as a decomposition application 550. As pictured, system 500 includes at least one processor circuit (or "processor"), e.g., a central processing unit (CPU) 505 coupled to memory and storage arrangement 520 through a system bus 515 or other suitable circuitry. System 500 stores program code within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store a decomposition application 550. The decomposition application 550, being implemented in the form of executable program code, is executed by processor(s) 505. As such, decomposition application 550 is considered part of system 500. System 500, while executing decomposition application 550, receives and operates on CNN filters 560. In one aspect, system 500 performs a design flow on CNN filters 560, and the design flow may include synthesis, mapping, placement, routing, and the application of one or more physical optimization techniques as described herein. System 500 generates an optimized, or modified, version of the CNN filters 560 as the decomposed filters 570.

The decomposition application 550, CNN filters 560, decomposed filters 570, and any data items used, generated, and/or operated upon by the decomposition application 550, are functional data structures that impart functionality when employed as part of system 500 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and circuits are thought to be applicable to a variety of systems for neural networks. Other aspects and features will be apparent to those skilled in the art from consideration of the specification. The methods and circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method for refactoring a convolution layer, comprising:
    convolving an input feature map with C NxN filters into a baseline output feature map;
    decomposing the C NxN filters into the refactorization components of K NxN first filters and C 1×1 second filters for the convolution layer, wherein N ≥ 1, and 1< K <C;
    convolving the input feature map of the convolution layer with the K NxN first filters into an intermediate volume having a depth of K;
    convolving the intermediate volume with the C 1×1 second filters into an output feature map having a depth of C;
    evaluating accuracy of the output feature map relative to the baseline output feature map associated with the C NxN filters; and
    reducing a value of K and repeating the decomposing, convolving the input feature map, convolving the intermediate volume, and evaluating in response to the accuracy of the output feature map being acceptable.

2. The method of claim 1, further comprising repeating the refactoring for a plurality of convolution layers, of a convolutional neural network.

3. The method of claim 2, further comprising retraining the convolutional neural network having respective refactorization components associated with the plurality of convolution layers.

4. The method of claim 1, further comprising storing the K NxN first filters and C 1×1 second filters from a previous iteration in association with the convolution layer in a memory in response to the accuracy of the output feature map being unacceptable and storage requirements of the output feature map being less than a threshold.

5. A system comprising:
    one or more processors;
    a memory arrangement coupled to the one or more processors and configured with instructions that when executed by the one or more processors cause the one or more processors to perform operations including:
        convolving an input feature map with the C NxN filters into a baseline output feature map;
        decomposing the C NxN filters into the refactorization components of K NxN first filters and C 1×1 second filters for a convolution layer, wherein N ≥ 1, and 1< K <C;
        convolving the input feature map of the convolution layer with the K NxN first filters into an intermediate volume having a depth of K;
        convolving the intermediate volume with the C 1×1 second filters into an output feature map having a depth of C;
        evaluating accuracy of the output feature map relative to the baseline output feature map associated with the C NxN filters; and
        reducing a value of K and repeating the decomposing, convolving the input feature map, convolving the intermediate volume, and evaluating in response to the output feature map being acceptable.

6. The system of claim 5, wherein the memory arrangement is further configured with instructions that when executed by the one or more processors cause the one or more processors to repeat the refactoring a plurality of convolution layers, of a convolutional neural network.

7. The system of claim 6, wherein the memory arrangement is further configured with instructions that when executed by the one or more processors cause the one or more processors to retrain the convolutional neural network having respective refactorization components associated with the plurality of convolution layers.

8. The system of claim 5, wherein the memory arrangement is further configured with instructions that when executed by the one or more processors cause the one or more processors to store the K NxN first filters and C 1×1 second filters from a previous iteration in association with the convolution layer in a memory in response to the accuracy of the output feature map being unacceptable and storage requirements of the output feature map being less than a threshold.

* * * * *